United States Patent
Asano

(10) Patent No.: US 6,651,076 B1
(45) Date of Patent: Nov. 18, 2003

(54) ARCHIVE COMPUTER SYSTEM AND METHOD FOR STORAGE AND RETRIEVAL OF RECORDS

(75) Inventor: Shintaro Asano, New Castle, NH (US)

(73) Assignee: Cablynx, Inc., Woburn, MA (US)

( * ) Notice: Subject to any disclaimer, the term of this patent is extended or adjusted under 35 U.S.C. 154(b) by 0 days.

(21) Appl. No.: 09/574,592

(22) Filed: May 19, 2000

Related U.S. Application Data

(60) Provisional application No. 60/134,915, filed on May 19, 1999.

(51) Int. Cl.[7] ............................ G06F 12/00; G06F 17/30
(52) U.S. Cl. ........................ 707/204; 707/102; 707/203
(58) Field of Search .......................... 707/1, 3, 10, 102, 707/203, 204

(56) References Cited

U.S. PATENT DOCUMENTS

| | | | |
|---|---|---|---|
| 5,150,473 A | * | 9/1992 | Zulch ............................ 360/48 |
| 5,764,972 A | * | 6/1998 | Crouse et al. ................. 707/1 |
| 5,848,418 A | * | 12/1998 | de Souza et al. ............ 345/744 |
| 6,041,334 A | * | 3/2000 | Cannon ....................... 707/204 |

* cited by examiner

*Primary Examiner*—Greta Robinson
*Assistant Examiner*—Susan Rayyan
(74) *Attorney, Agent, or Firm*—Lowrie, Lando & Anastasi, LLP

(57) ABSTRACT

A computer network system is set forth for bi-directionally communicating information in a predetermined format between a plurality of client computers and a server. The system includes an archive computer system having a mass storage database. The archive computer system can store and retrieve a number of client records to and from the mass storage database. Prior to storing each client record in the database, the record is appended with a transparent sector. The transparent sector includes software application and version related information which is associated with the software application and version used to generate the record. Upon retrieval of the record from the mass storage database, the contents of the transparent sector is compared to a table to insure the requesting client computer includes a software application and version compatible with the retrieved record.

7 Claims, 3 Drawing Sheets

ARCHIVE COMPUTER SYSTEM AND METHOD FOR STORAGE AND RETRIEVAL OF RECORDS

RELATED APPLICATION

The present application claims priority from U.S. Provisional Application No. 60/134,915, filed May 19, 1999.

FIELD OF THE INVENTION

The present invention is directed to methods and apparatus for storing and retrieving records.

BACKGROUND OF THE INVENTION

There are several companies that provide offsite electronic data storage management and disaster recovery services. These services typically provide for storage of electronic records on either hard drives or tape media for customers in a safe and secure environment. The records stored typically include backups of current records as well as archived records. The archived records typically include older files that need not be accessed frequently, if ever again, but that are stored in accordance with statutory requirements (i.e., tax records), contractual requirements (i.e., engineering design documents and drawings) and company data archival policies.

One problem that often occurs when accessing archived files, is that the application software that was used to create the files is no longer available making it difficult or impossible to retrieve the data stored in the files. This problem may occur because of upgrades or revisions that have occurred to the application software used to create the file or because the application is simply no longer available. When an application software manufacturer upgrades an application and releases a new version, it is normally expected that the manufacturer will provide for some backward compatibility that allows the new version of the application to read files created using the previous version of the application. However, this backward compatibility does not typically extend beyond one or two prior revisions.

SUMMARY OF THE INVENTION

A computer network system is set forth for providing bi-directional communication in a predetermined format between a plurality of client computers and a server computer in accordance with one embodiment of the present invention. More precisely, the system includes an archive computer system, which can store and retrieve a number of client records. The archive computer is coupled to a number of user-computers, via a firewall gateway, and computer network respectively. The archive computer system can include a processor and associated memory, a non-volatile storage medium, an operating system and a mass storage database, which contains the number of client records. Each of the client records includes a transparent sector having predetermined client related information. The archive computer system stores and retrieves the records in the database in accordance with the information defined in the transparent sector. The archive computer system further includes a catalogue which contains predetermined information related to the records stored in the mass storage database.

A method of storing records on the archive computer system includes, receiving a record at the archive computer system from a client computer for storage in the mass storage database, the record including name and revision of application software used to generate the record; appending a transparent sector to the record, the transparent sector including the name and revision of application software used to generate the record, a client identifier, file name, a short description of the subject matter contained in the record, date and time which defines when the file was received at the archive computer system; assigning a record name to the record which includes the transparent sector; storing the record, including the transparent sector, at a predetermined location defined in the mass storage database; and storing the record name and the predetermined location of the record defined in the mass storage database in the catalogue.

The method of storing records further includes storing a name and revision of application software used to generate each record defined in the mass storage database in the catalog. Other record related information, which is stored in the catalogue, can include client identity, record name, and the date and time at which the record was stored in the mass storage database.

The method of retrieving records from the archive computer system includes receiving a request at the archive computer system from the client computer for retrieval of a stored record; determining the location of the record in the catalogue; retrieving the record; reading the transparent sector associated with the record to determine the application software program and version used to generate the record; comparing the application software program and version used to generate the record with a directory of applications currently being used by the client computer that has requested the record; determining if the application software program and version used to generate the record matches an application software program and version defined in the table, and if a match is determined, the record can be sent to the client computer, and if a match is not determined, the record can be sent to the client computer with an application software program and version compatible with the application software program and version used to generate the record.

BRIEF DESCRIPTION OF THE DRAWINGS

For a better understanding of the present invention, reference is made to the drawings which are incorporated herein by reference and in which.

DETAILED DESCRIPTION

Embodiments of the present invention are described herein with reference to an Internet-based computer network system and method for storing and retrieving records on an archive computer system. However, as understood by one skilled in the art, the present invention is not limited to Internet-based systems and can include systems employing other computer networks as well as stand alone systems.

Figure 1:
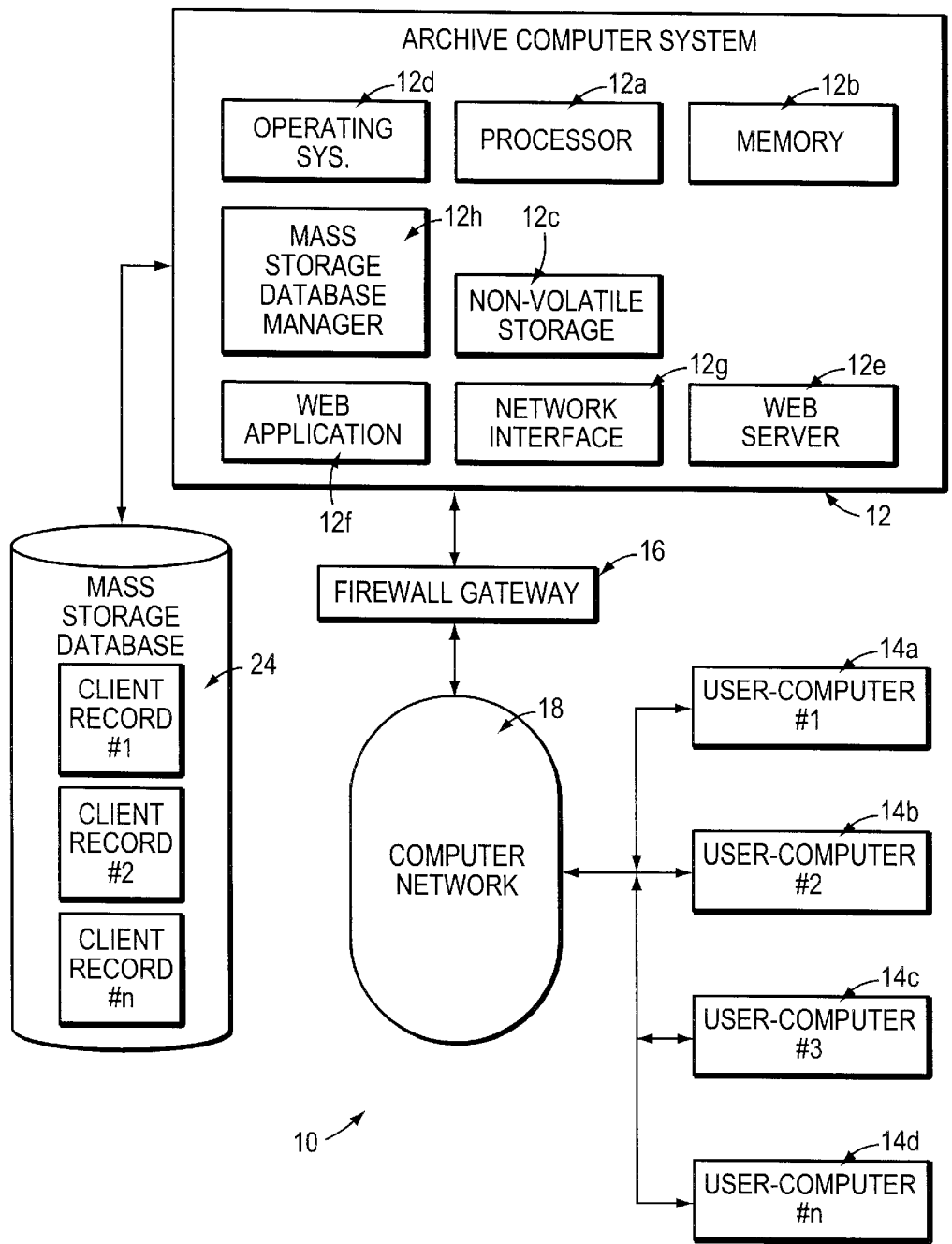
FIG. 1 shows a high level block diagram of an archive computer system in accordance with the present invention.

FIG. 1 shows a computer network system 10 suitable for bi-directionally communicating information in a predetermined format between a plurality of client computers and a server computer in accordance with one embodiment of the present invention. More precisely, the system 10 includes an archive computer system 12 coupled to a number of user-computers, 14a, 14b, 14c and 14d, via a firewall gateway 16 and computer network 18 respectively.

The computer network 18 can be any one of a number of conventional network systems, including a local area network (LAN), such as an intranet, or a wide area network (WAN), such as an internet, as is known in the art. The computer network 18 includes functionality for packaging user-computer 14a, 14b, 14c and 14d calls in a well-known format (e.g., URL) together with any parameter information into a format (of one or more packets) suitable for transmission across a data bus for delivery to the archive computer system 12.

In this embodiment of the present invention, the archive computer system 12 can comprise a conventional computer server such as an "NT-Server" which can be provided by MICROSOFT of Richmond, Washington or a "Unix Solaris Server" which can be provided by Sun Micro Systems of Palo Alto, California. These computer servers can be programmed with conventional Web-page interface software, such as: "Visual Basic", "JAVA", "JAVASCRIPT", "HTML/DHTML", "C++", "J+", "Perl" or "PERLSCRIPT", or "ASP".

The archive computer system 12 can include a processor 12a, assoiated memory 12b, a non-volatile storage medium 12c, such as a magnetic or optical disk drive, operating system 12d, Web server 12e software, Web Application 12f, such as an e-commerce application, computer network interface 12g and mass storage device manger 12h. The archive computer system 12 further includes a mass storage database 24 having a number of client records defined therein. The mass storage database can include, a disk drive or disk drive array, tape drive or tape library system, or optical disk drive or optical disk drive array. Generally, the archive computer system 12 includes hardware necessary for running software to (1) access mass storage database 24 records for processing user requests, and (2) to provide an interface for serving client records to and for receiving client records from user-computers 14a, 14b, 14c and 14d. In a preferred embodiment, World Wide Web server 12e and World Wide Web application 12f include software running on the archive computer system 12 which supports the World Wide Web protocol for providing data between the archive manager computer 12 and one or more of the user-computers 14a, 14b, 14c and/or 14d.

In this embodiment, the archive computer system 12 can include an operating system 12d (e.g., UNIX) which runs a mass storage database management system 12h, the World Wide Web application 12f, and the World Wide Web server 12e. The software on the archive manager computer 12 can assume numerous configurations. For example, it can be provided on a single machine or distributed over multiple machines.

Each user-computer 14a, 14b, 14c and/or 14d includes a conventional workstation or personal computer having a World Wide Web browser for providing a user interface to the archive computer system 12.

Figure 2:
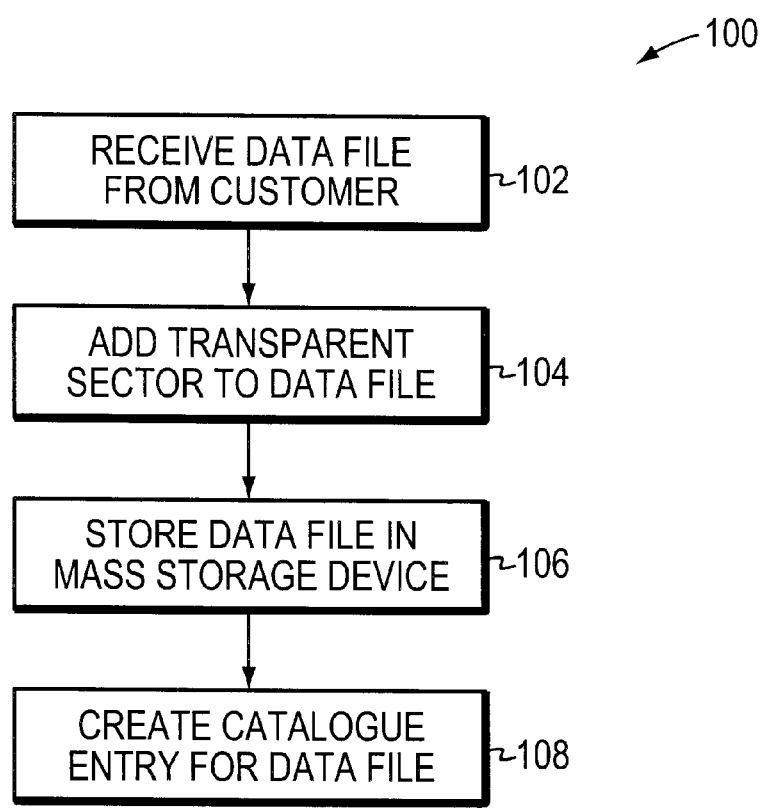
FIG. 2 shows a flow chart of a record storage process which is executable on the system shown in FIG. 1.

A process 100 for storing records on the system shown in FIG. I will now be described with reference to FIG. 2, which shows a flowchart of the storage process. In a first step 102 of the process 100 a record is received from a customer for storage. The record may be received electronically over, for example, the Internet or through a modem connection over a public switched telephone connection (PSTN). When sending the file, the customer indicates the particular application software including version number that was used to create the file.

In step 104 of the process 100, a transparent sector is added to the record. The transparent sector contains information including the name and revision of the application used to create the record, the customer's identity, the file name (generally provided by the customer) and the date and time when the file was received from the customer. In step 106, the record, including the transparent sector, is stored in the mass storage database. Finally, in step 108, the name of the file and location of the file defined in the mass storage database is stored in a catalogue. The catalogue may be created using one of a number of database management systems as is known in the art. In addition, in embodiments of the present invention, the catalogue may include the information stored in the transparent sector of the file.

Figure 3:
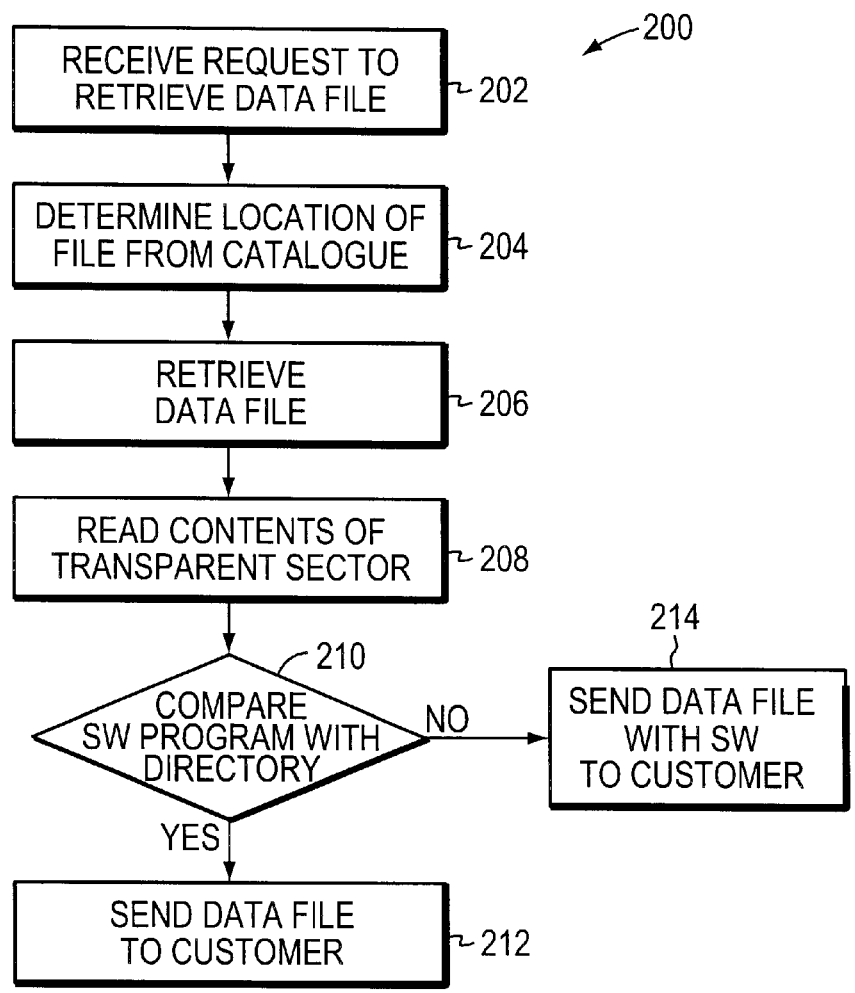
FIG. 3 shows a flow chart of a record retrieval process which is executable on the system shown in FIG. 1.

A process 200 of retrieving records on the system shown in FIG. 1 will now be described with reference to FIG. 3, which shows a flowchart of the retrieval process. In a first step 202 of the process 200, a request is received from a customer for retrieval of a stored file. The request may be received electronically, for example, using e-mail, or the request may be in the form of a letter or telephone call. The location of the file is then determined in step 204 using the catalogue system. The file is then retrieved in step 206, and in step 208, the contents of the transparent sector are read to determine the application software program and version used to create the file. The application software program and version used to create the record are compared in step 210 with a directory of applications currently being used by the customer that has requested the record. If the outcome of step 210 is YES, indicating that the customer has that version, or a compatible version, of the application, then in step 212, the file is sent, either electronically or manually on a storage medium to the customer.

If the outcome of step 210 is NO, then in step 214, the file is sent, either electronically or manually to the customer along with a version of the software application compatible with the program used to create the record.

In another embodiment of the present invention, when the output of step 210 is NO, the file is opened using a compatible version of the software application, stored in a format compatible with one of the applications currently being used by the customer, and sent to the customer.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting.

What is claimed is:

1. A method of storing records on and retrieving records from an archive computer system, the archive computer system including a mass storage database and a catalog, the method comprising the steps of:

receiving a record at the archive computer system from a client computer for storage in the mass storage database, the record including name and revision of application software used to generate the record;

appending a transparent attachment to the record, the transparent attachment including the name and revision of application software used to generate the record, a client identifier, file name, date and time which defines when the file was received at the archive computer system;

storing the record, including the transparent attachment, in the mass storage database;

retrieving the record having the transparent attachment from the database;

reading the transparent attachment associated with the record to determine the application software program and version used to generate the record;

comparing the application software program and version used to generate the record a directory of applications currently being used by a client computer that has requested the record to determine if there is a match; and determining if the application software program and version used to generate the record matches an application software program and version defined in the directory, and if a match is determined then sending the record to the client computer; and if a match is not determined, then sending the record to the client with an application software program and version compatible with the application software program and version used to generate the record.

2. The method of storing records on and retrieving records from an archive computer system of claim 1, further including the step of storing a name and revision of application software used to generate each record defined in the mass storage database in the catalog.

3. The method of storing records on and retrieving records from an archive computer system of claim 2, further including the step of storing a client identity, record name, date and time which defines when the record was stored in the mass storage database in the catalog.

4. A method of storing records on and retrieving records from an archive computer system, the archive computer system including a mass storage database and a catalog, the method comprising the steps of:

receiving a record at the archive computer system from a client computer for storage in the mass storage database, the record including name and revision of application software used to generate the record;

appending a transparent sector to the record, the transparent sector including the name and revision of the application software used to generate the record, a client identifier, file name, date and time which defines when the file was received at the archive computer system;

assigning a record name to the record which includes the transparent sector;

storing the record, including the transparent sector, at a predetermined location defined in the mass storage database;

storing the record name and the predetermined location of the record defined in the mass storage database in the catalog;

storing the name and revision of application software used to generate each record defined in the mass storage database in the catalog;

storing a client identity, record name, date and time which defines when the record was stored in the mass storage database in the catalog;

receiving a request at the archive computer system from the client computer for retrieval of a stored record;

determining the location of the record in the catalog;

retrieving the record;

reading the transparent sector associated with the record to determine the application software program and version used to generate the record;

comparing the application software program and version used to generate the record with a directory of applications currently being used by the client computer that has requested the record; and determining if the application software program and version used to generate the record matches an application software program and version defined in the directory, and if a match is determined then sending the record to the client computer; and if a match is not determined, then sending the record to the client computer with an application software program and version compatible with the application software program and version used to generate the record.

5. An archive computer system for storing and retrieving a number of client records, the archive computer system comprising:

a processor and associated memory;

a non-volatile storage medium coupled to the processor, the non-volatile storage medium including a mass storage database;

means for appending a transparent attachment to the record, the transparent attachment including name and revision of an application software program used to generate the record, a client identifier, file name, date and time which defines when the file was received at the archive computer system;

means for reading the transparent attachment associated with the record to determine the application software program and version used to generate the record;

means for comparing the application software program and version used to generate the record with a directory of applications currently being used by a client computer that has requested the record to determine if there is a match; and means for determining if the application software program and version used to generate the record matches an application software program and version defined in the directory, and if a match is determined then sending the record to the client computer; and if a match is not determined, then sending the record to the client computer with an application software program and version compatible with the application software program and version used to generate the record.

6. An archive computer system for storing and retrieving a number of client records, comprising:

a processor and associated memory;

a non-volatile storage medium coupled to the processor, the storage medium including a mass storage database;

wherein the number of client records are stored in and retrieved from the database, wherein the processor is programmed to provide each client record with a transparent attachment having name and revision of application software used to generate each record defined in the mass storage database, wherein the processor is programmed to retrieve the record having the transparent attachment from the database in response to a request from a client computer and to compare the application software program and version used to generate the record with a directory of applications currently being used by the client computer that has requested the record, and wherein the processor is programmed to determine if the application software program and version used to generate the record matches an application software program and version defined in the directory, and if a match is determined then sending the record to the client computer; and if a match is not determined, then sending the record to the client computer with an application software program and version compatible with the application software program and version used to generate the record.

7. The archive computer system of claim 6, wherein the transparent attachment further includes a client identity, record name, a short description of the subject matter contained in the record, date and time which defines when the record was stored in the mass storage database.

* * * * *

UNITED STATES PATENT AND TRADEMARK OFFICE
CERTIFICATE OF CORRECTION

PATENT NO.   : 6,651,076 B1
DATED        : November 18, 2003
INVENTOR(S)  : Shintaro Asano It is certified that error appears in the above-identified patent and that said Letters Patent is hereby corrected as shown below:

Column 5,
Line 5, after the word "record" please insert -- with --.

Signed and Sealed this

Thirtieth Day of March, 2004

JON W. DUDAS
*Acting Director of the United States Patent and Trademark Office*